United States Patent
He et al.

(10) Patent No.: US 10,372,699 B2
(45) Date of Patent: Aug. 6, 2019

(54) PATCH-UP OPERATIONS ON INVALIDITY DATA

(71) Applicant: Oracle International Corporation, Redwood Shores, CA (US)

(72) Inventors: Xiaoming He, Redwood Shores, CA (US); Solmaz Kolahi, Redwood City, CA (US); Vivekanandhan Raja, Fremont, CA (US); Tirthankar Lahiri, Palo Alto, CA (US); Vasudha Krishnaswamy, Fremont, CA (US); Sanket Hase, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 248 days.

(21) Appl. No.: 15/264,978

(22) Filed: Sep. 14, 2016

(65) Prior Publication Data

US 2018/0075079 A1 Mar. 15, 2018

(51) Int. Cl.
*G06F 16/23* (2019.01)

(52) U.S. Cl.
CPC ...... *G06F 16/2322* (2019.01); *G06F 16/2365* (2019.01)

(58) Field of Classification Search
CPC ......... G06F 17/30353; G06F 17/30371; G06F 17/30545
See application file for complete search history.

(56) References Cited

U.S. PATENT DOCUMENTS

| | | | |
|---|---|---|---|
| 9,128,972 B2 | 9/2015 | Raja et al. | |
| 9,323,799 B2 | 4/2016 | Hase et al. | |
| 9,483,517 B2 | 11/2016 | Raja et al. | |
| 9,606,921 B2 * | 3/2017 | Kamp | G06F 15/78 |
| 9,678,850 B1 * | 6/2017 | Rickard | G06F 11/3409 |
| 9,881,048 B2 | 1/2018 | Kamp et al. | |
| 2005/0076113 A1 * | 4/2005 | Klotz | H04L 41/12 709/224 |
| 2009/0216709 A1 * | 8/2009 | Cheng | G06F 17/30442 |
| 2016/0350363 A1 * | 12/2016 | Raja | G06F 17/30377 |
| 2017/0262489 A1 * | 9/2017 | Seo | G06F 17/30377 |
| 2017/0286291 A1 * | 10/2017 | Thomas | G06F 12/0253 |
| 2018/0060378 A1 * | 3/2018 | Kulkarni | G06F 17/30371 |

* cited by examiner

*Primary Examiner* — Ashish Thomas
*Assistant Examiner* — Aryan D Toughiry
(74) *Attorney, Agent, or Firm* — Elliot H. Karlin; Hickman Palermo Becker Bingham LLP

(57) ABSTRACT

Techniques are described for maintaining coherency of a portion of a database object populated in the volatile memories of multiple nodes in a database cluster. The techniques involve maintaining a local invalidation bitmap for which identifies block-level invalidity data and item-level invalidity data. In response to detecting a patch-up triggering event, a particular node identifies, in the block-level invalidity data, blocks that have been marked as invalid. For each block that has been marked as invalid, the node identifies specific items that have changed and marks the items as invalid in the item-level invalidity data. The node then updates the block-level invalidity data to indicate that the blocks are no longer invalid.

20 Claims, 8 Drawing Sheets

PATCH-UP OPERATIONS ON INVALIDITY DATA

FIELD OF THE INVENTION

The present invention relates to data storage and retrieval techniques in a database, and more specifically to improved computer-implemented techniques for maintaining cross-node invalidity data of an in-memory database object in a multi-node database cluster.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be pre-loaded into volatile memory. Various approaches for loading entire database objects, or selected portions thereof, into volatile memory to speed up database operation processing are described in U.S. patent application Ser. No. 14/377,179, entitled "Mirroring, In Memory, Data From Disk To Improve Database operation Performance", filed Jul. 21, 2014, referred to herein as the "Mirroring" application, the contents of which is incorporated herein in its entirety.

According to the approaches described in the Mirroring application, database objects, or portions thereof, are stored in volatile memory in a different format than the format that those same objects have on disk. For example, the in-memory copies of the objects may be stored in a column-major format, while the on-disk copies are stored in a row-major format. An in-memory version or copy of an object (or selected portions thereof), is referred to herein as an In-Memory-Columnar Unit (IMCU).

On-disk data is stored in "blocks". For disk blocks that store data for a table of a database, a single block may contain items from a plurality of rows of the table. When a particular node wishes to make a change to one or more items that are stored in a particular block, the particular node obtains a write lock that covers the particular block, loads a copy of the block into a buffer cache in volatile memory, and makes the change to the cached copy of the block. When the transaction that made the change commits, the changes made by the transaction become permanent.

When the data items in a block are changed, then the copies of those data items that reside in IMCUs become stale. For example, assume that block A has items X, Y and Z, and that a transaction in node 1 updates item X. Assume further that copies of items X, Y and Z are in an IMCU in node 2. After the update to item X made in node 1, the copy of item X in the IMCU in node 2 is stale. To prevent the use of stale data, node 2 responds to the update to block A by updating locally-stored invalidity data to indicate that, within its IMCU, block A is invalid.

When the invalidity data for an IMCU indicates that a block is invalid, then the node that hosts the IMCU must go to a source other than the IMCU to obtain the current version of data from the block. For example, because node 2 has marked block A as invalid for its IMCU, node 2 will respond to requests for current versions of items X, Y and Z by obtaining those versions from other sources (such as an in-memory journal, buffer cache, or disk). Because these items must be obtained from other sources, the efficiency improvement that results from maintaining the IMCU in node 2 is diminished.

In the foregoing example, only item X was actually updated. Consequently, the IMCU within node 2 actually has the most recent version of items Y and Z. However, because the invalidation is performed at the block level, node 2 treats all items from block A as being invalid. Thus, node 2 looks elsewhere for the current versions of items Y and Z even though the IMCU within node 2 has the current versions of items Y and Z.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for converting coarser-granularity invalidity data for an IMCU to finer-granularity invalidity data for the IMCU. The process of performing such a conversion on the invalidity data is referred to herein as a "patch-up operation". After a patch-up operation, items within the IMCU that were not actually invalid cease to be treated as invalid. For example, in one embodiment a patching operation converts block-level invalidity data to row-level invalidity data. In such an embodiment, prior to the patching of the invalidity data, all rows in a block are treated as invalid when a single row within the block is updated. After the patching of the invalidity data, only the updated row is treated as invalid, while items from all other rows within the block are treated as valid.

In an embodiment where the invalidity data is maintained at block-level granularity, a particular node storing block-level invalidity data may detect a patch-up triggering event. Examples of events that may trigger patch-up operations are described in greater detail hereafter. In response to detecting the patch-up triggering event, the particular node identifies, in the block-level invalidity data, blocks that have been marked as invalid. For each invalid block, the particular node identifies which specific items in the block have actually changed. The particular node then updates item-level invalidity data to indicate that the specific items are no longer valid. The particular node also updates block-level invalidity data to indicate that the identified blocks are no longer invalid.

System Overview

Figure 1:
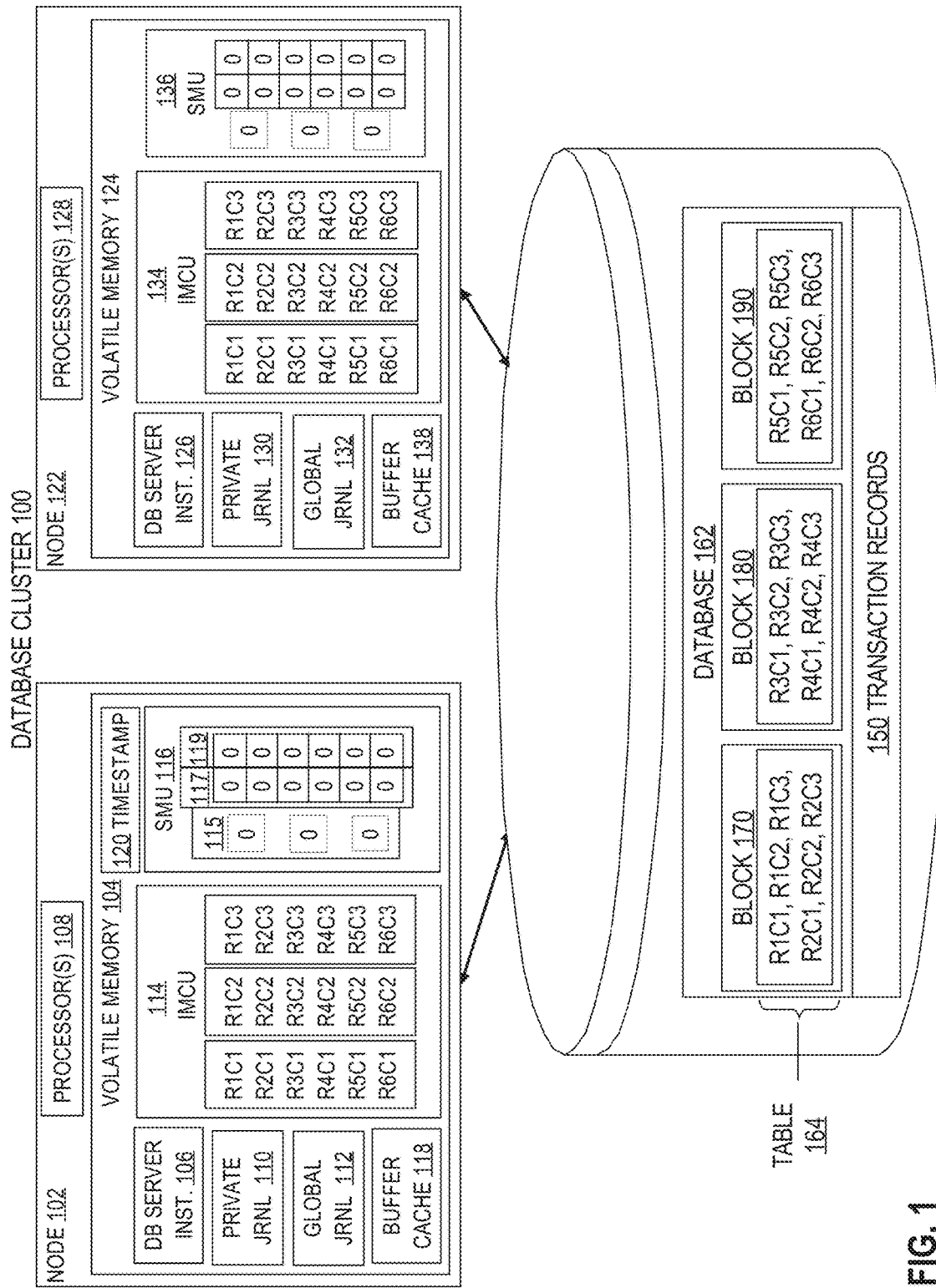
FIG. 1 is a block diagram illustrating a database cluster with a current version of a database object in the volatile memories of multiple nodes.

Referring to FIG. 1, database cluster 100 has two nodes 102 and 122. Nodes 102 and 122 respectively have one or more processors 108 and 128, and local volatile memory 104 and 124. In addition, nodes 102 and 122 are respectively executing database server instances 106 and 126. While in the illustrated embodiment each node is executing a single database server instance, in alternative embodiments a single node may execute more than one database server instance.

Database server instances 106 and 126 execute database commands that are submitted to a database server by one or more database applications (not shown). The data used by those applications is primarily in database 162.

Database 162 contains database objects such as table 164. Table 164 includes three columns c1-c3, and six rows r1-r6 for a total of eighteen data items shown as: R1C1, R1C2, R1C3, R2C1, R2C2, R2C3, R3C1, R3C2, R3C3, R4C1, R4C2, R4C3, R5C1, R5C2, R5C3, R6C1, R6C2, and R6C3. Although the data items are logically arranged in a table when viewed by a user, in the embodiment illustrated in FIG. 1, data items for table 164 are stored as row-major blocks 170, 180, 190 on disk. Database 162 contains transaction records 150 for storing the most recent updates to data items in the blocks.

Block 170 stores data items R1C1, R1C2, R1C3, R2C1, R2C2, R2C3

Block 180 stores data items R3C1, R3C2, R3C3, R4C1, R4C2, R4C3

Block 190 stores data items R5C1, R5C2, R5C3, R6C1, R6C2, R6C3

Each of nodes 102 and 122 is able to independently access any block 170, 180, 190 of table 164. After accessing a particular block, the block may be cached in a local buffer cache 118 and 138. It is much faster for any given database server instance to access data items of table 164 from blocks that are stored in its local volatile memory. If a node updates a block and the modifications to that block are not reflected on disk, that particular buffer cache is referred to as "dirty." If the node has a copy of a block in a local buffer cache and the copy of the bock is the same as the on-disk copy, then the buffer cache is said to be "clean."

For the purpose of illustration, database 162 is shown as stored on a single shared disk, but in alternative embodiments, database 162 may be spread across multiple disks to which each of nodes 102 and 122 have access.

In-Memory Columnar Units (IMCUS)

In an embodiment, mirror format data is organized, within volatile memory 104 and 134 in IMCU 114 and 134. Mirror format data may include copies of all of the persistent format data, or a subset thereof. Thus, although nodes 102 and 122 are depicted as including copies of each data entry in blocks 170, 180, and 190, in an embodiment node 102 only contains a copy of a subset of the data in database 162. Data stored in IMCU 114 may be specified by a user of node 102 as "in-memory enabled" data from database 162.

In an embodiment, the mirror format data in IMCU 114 and 134 is used to satisfy queries. By using mirror format data, node 102 and 122 are able to supply data items that are unavailable in buffer cache 118 and 138 without needing to access database 162 in persistent storage.

Even in situations where the data required by a database operation is not included in the mirror format data in IMCU 114 and 134, the mirror format data may be used to evaluate predicates, and thereby speed up the database operations in the same manner as conventional indexes. For example, assume that table 200 has thousands of rows, and in only three of those rows does column c1 have the value "joe". Under these circumstances, a database server may receive a database command that requests the values, from column c3, of all rows where c1="joe".

In this example, the data that needs to be returned by the database command is from column c3, which is not in the mirror format data. However, the data in IMCU 114 and 134 for column 1 may be used to quickly identify the three rows where c1="joe". This operation can be performed efficiently because the data items required to evaluate the predicate (values from c1) are stored contiguously in volatile memory. Once those rows have been identified, the database server may retrieve from disk only those blocks needed to obtain the data from those three rows.

Journals

According to one embodiment, IMCUs are treated as read-only. Treating an IMCU as read-only reduces overhead, particularly in situations where the IMCU is in a compressed format. If not treated as read-only, every time any item within the IMCU is updated, the entire IMCU would have to be decompressed, updated, and recompressed.

According to one embodiment, because the IMCU is treated as read-only and therefore will not itself reflect changes made after the IMCU is created, every database operation affecting data stored in IMCU 114 or 134 is tracked in a private journal (110 or 130) maintained for the transaction that is performing the operation. A transaction is a sequence of database operations that are treated as a single unit. Using the private journal, a node may track transaction-specific changes to items that have MF copies in the node's IMCU without actually changing those MF copies in the IMCU.

Any given transaction is able to access its own private journal to see all changes that it itself has made, but no other transactions can see those changes until the transaction commits. For example if node 102 is executing a transaction X associated with private journal 110, private journal 110 is only accessible by transaction X until transaction X commits. Once the transaction X commits, the aggregate changes from private journal 110 are pushed to a corresponding global journal.

Invalidity Data

To ensure that each node is aware of the IMCU data that is no longer valid, each IMCU has a corresponding snapshot metadata unit (SMU) (116 and 136) that stores, among other things, invalidity data. According to one embodiment, each SMU includes a plurality of bitmaps that indicate which portions of the IMCU are invalid, where each bitmap of the plurality of bitmaps indicates invalidity at a different level of granularity.

For example, in FIG. 1, SMU 116 for IMCU 114 includes a block-level invalidity bitmap 115, and a row-level invalidity bitmap 117. Block-level invalidity bitmap 115 indicates which blocks in database 162 have invalid data items within IMCU 114. Row-level invalidity bitmap 117 indicates which rows in database 162 have invalid data items within IMCU 114. In the illustrated embodiment, SMU 116 also includes a journal bitmap 119. The journal bitmap 119 indicates which invalid rows have their updated information stored in a journal. In the state illustrated in FIG. 1, no bits are set in any of the bitmaps 115, 117 or 119. Consequently, all data within IMCU 114 is valid.

Invalidity data is updated in response to changes to database 162. For example, when a node desires to update a block (the "target block"), the node requests a write lock on the target block. In response to the write lock request, other nodes will be asked to release any shared locks that they hold on the target block. One or more of those other nodes may be hosting IMCUs that contain that data from the target block. When a host node of an IMCU releases its shared lock on a block of data that is mirrored in its IMCU to allow another node to obtain a write lock, the host node assumes that the node that obtained the write lock will be changing one or more of the data items in the block. Consequently, in response to releasing its shared lock, the host node updates the block-level invalidity data to indicate that data in the IMCU which corresponds to the block is invalid. The host node also requests a new shared lock. The new shared lock will be granted only after the node that obtained the write lock releases the write lock.

For example, if node 122 obtained a write lock on block 170 which contains rows 1 and 2, node 102 would be asked to release a shared lock on block 170. In response, node 102 would update block level invalidity data 115 in SMU 116 to indicate that data in IMCU 114 corresponding to block 170 is no longer valid. Node 102 then requests a new shared lock on block 170. Thus, each host node uses block-level invalidity data to indicate changes made by nodes other than the host node.

In contrast, each host node uses the row-level invalidity data to indicate changes made locally. Specifically, when a transaction in a node that hosts an IMCU performs an update to rows in the database that are mirrored in the IMCU, the host node updates the row-level invalidity data for the IMCU to indicate that data, in the IMCU, from those particular rows, is no longer valid. For example, if node 102 commits a transaction that affected data in row 3 (which is contained in block 180), node 102 would update row-level invalidity data 117 in SMU 116 to indicate that data in IMCU 114 corresponding to row 3 is no longer valid, but other rows in block 180 would continue to be treated as valid.

Timestamps

Database systems typically assign commit timestamps to transactions at the time the transactions commit. The commit timestamps are assigned such that the order of the commit timestamps reflects the order in which the respective transactions committed. Timestamps may also be used for other purposes. For example, for a new transaction to see a consistent state of the database, the transaction may be assigned a "snapshot time". The database server then ensures that the transaction sees all changes made by transactions that committed before that snapshot time, and no changes made by transactions that committed after that snapshot time.

In addition to commit timestamps and snapshot times, a "populate timestamp" and a "last-patch timestamp" may be maintained for each IMCU. The populate timestamp of an IMCU indicates the state of the database that is reflected in the IMCU. More specifically, the data items in an IMCU reflect all changes that were committed to those data items before the time indicated by the populate timestamp of the IMCU, and no changes that were committed to those data items after time indicated by the populate timestamp. In FIG. 1, timestamp 120 represents the populate timestamp of IMCU 114.

The last-patch timestamp of an IMCU indicates the time at which the last patch-up operation was performed on the invalidity data for the IMCU. If no patch-up operation has been performed yet on an IMCU, then the populate timestamp of the IMCU is used as the last-patch timestamp. With each patch-up operation, the last-patch timestamp is updated to reflect the time at which the patch-up operation was performed.

Transaction Records

According to one embodiment, database 162 stores transaction records 150 that provide information about transactions that have affected database 162. Transaction records may include undo records and/or a journal of transactions. Undo records are records that indicate how to undo changes that have been made to data blocks. Undo records may be used to allow transactions to see a consistent view of the database.

For example, when a transaction starts, a database server may assign a "snapshot time" to the transaction. During execution of the transaction, the transaction must be provided versions of the data that (a) reflect all changes made to the data before the snapshot time, and (b) reflect no changes made to the data after the snapshot time. In situations where the data items that must be seen by a transaction have been updated since the snapshot time assigned to the transaction, undo records may be applied to the current version of the block to remove the changes that were made after the snapshot time. For example, assume that a transaction TX1 is assigned a snapshot time of T1, and has to read items in block X. Assume further that block X was changed by a transaction TX2 that committed at time T2. Before block X can be provided to transaction TX1, undo records are applied to block X to remove the changes that were made by transaction TX2 at time T2.

Patch-Up Operations

Patch-up operations are operations in which coarser-grained invalidity data is converted into finer-grained invalidity data. In embodiments described above, the host node of an IMCU keeps track of invalidation on a row-by-row basis for local updates, and on a block-by-block basis for updates made by other nodes. In many examples given hereafter, patch-up operations involve converting block-level invalidity data into row-level invalidity data. However, the techniques described herein are not limited to any particular coarser/finer granularity combination.

Figure 2A:
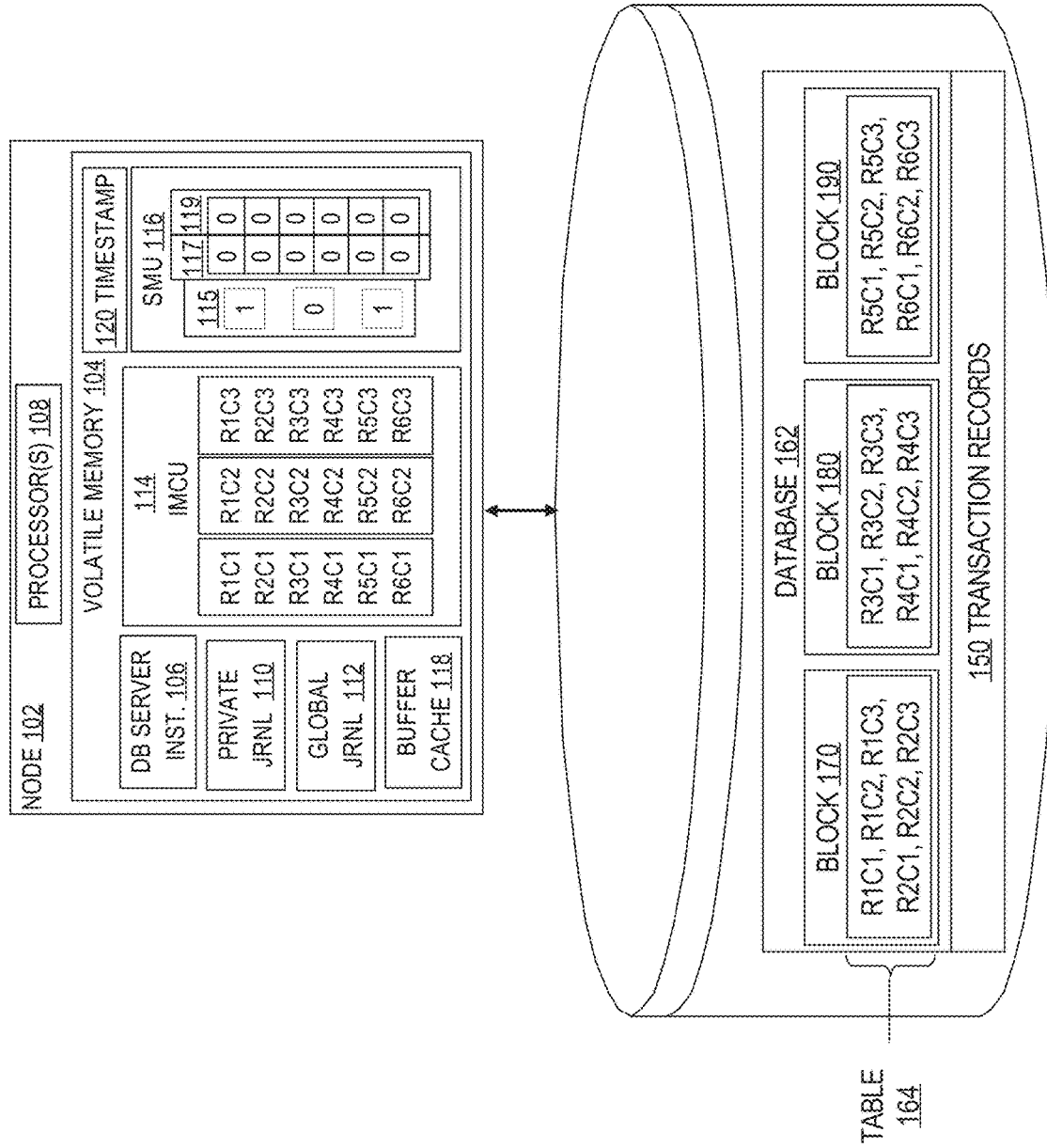
FIG. 2A is a block diagram illustrating a single node of a database cluster and an on-disk database.

An example of a patch-up operation shall be given with reference to FIGS. 2A, 2B, 2C, 2D, and 3. FIG. 2A is a block diagram illustrating node 102 of a database cluster. According to one embodiment, host nodes may perform patch-up operations independently of patch-up operations on other host nodes. Therefore, to simplify the illustration of a patch-up operation, the other nodes of the cluster are not shown in FIGS. 2A, 2B, 2C, 2D, and 3. The methods described in the present disclosure are not limited to any particular number of nodes in the database cluster, and embodiments may include hundreds or thousands of nodes.

Figure 2B:
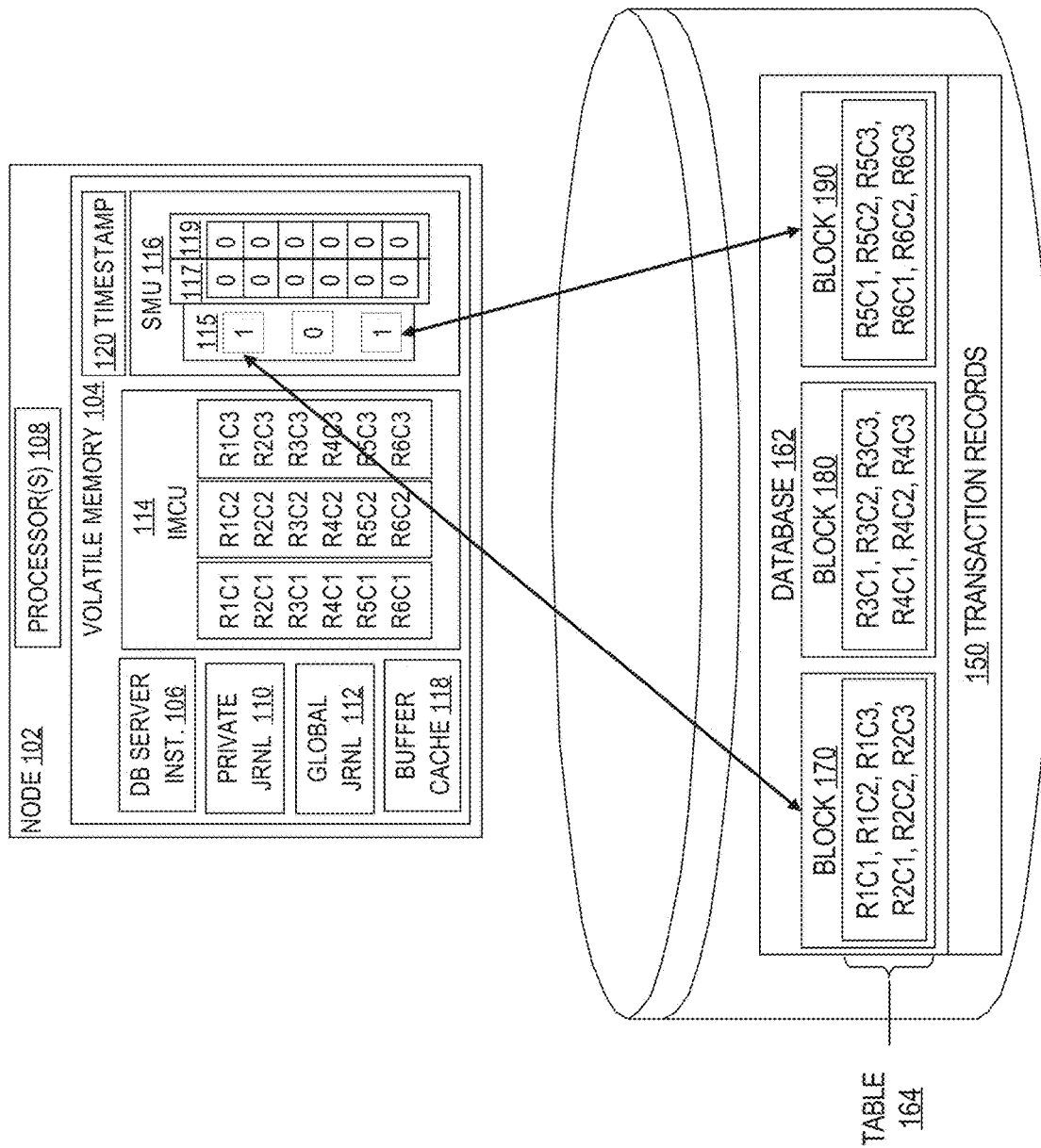
FIG. 2B is a block diagram illustrating a database with block-level invalidity data identifying invalidity on a block-level basis.

Referring to FIG. 2A, block-level invalidity bitmap 115 indicates that, within IMCU 114, data items from two blocks are currently considered invalid. Blocks that are indicated to be invalid in the block-level invalidity bitmap 115 are referred to herein as "marked-invalid blocks". In FIG. 2A, the marked-invalid blocks are blocks 170 and 190. The correlation between the bits of block-level invalidity bitmap 115 and blocks 170 and 190 is illustrated in FIG. 2B. Specifically, the topmost bit in the block-level invalidity data of SMU 116 corresponds to the top two rows in IMCU 114 which correspond to the data stored in block 170 in database 162. Similarly, the bottommost bit in the block-level invalidity data of SMU 116 corresponds to the bottom two rows in IMCU 114 which correspond to the data stored in block 190 in database 162.

Figure 2C:
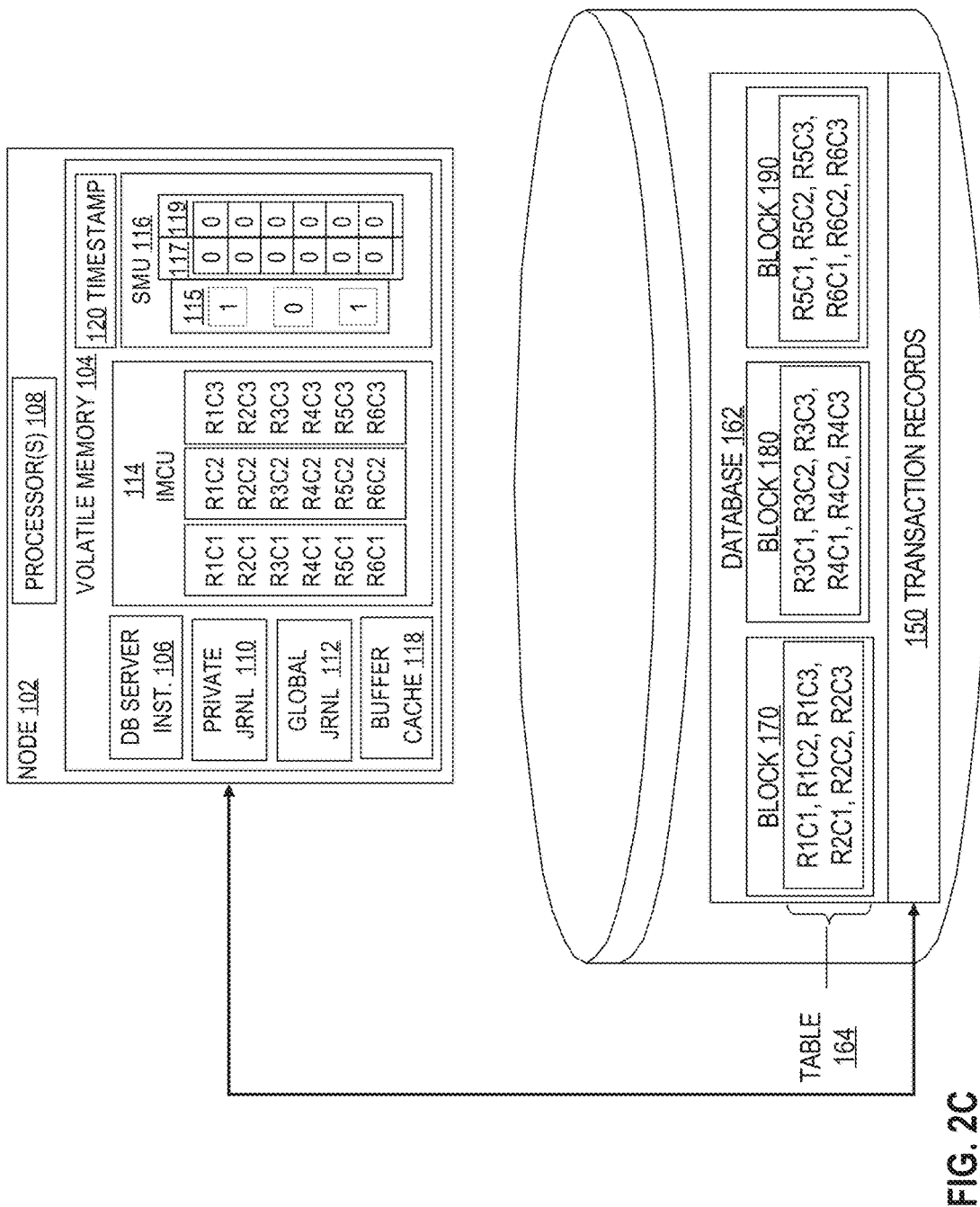
FIG. 2C is a block diagram illustrating a node of a database cluster accessing transaction records of an on-disk database to identify item-level invalidity.
Figure 2D:
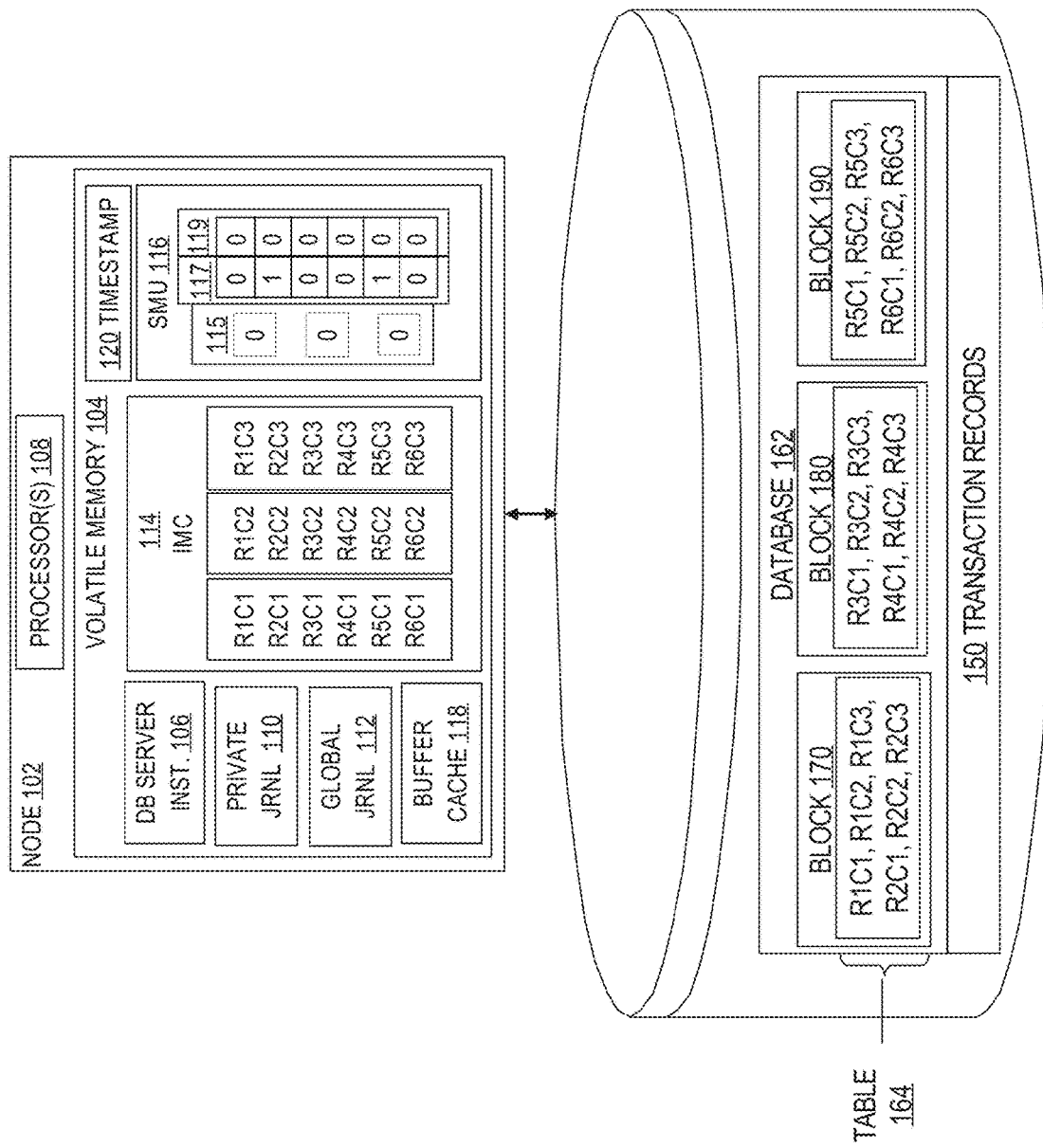
FIG. 2D is a block diagram illustrating a node of a database cluster updating invalidity data based on accessed transaction records.
Figure 3:
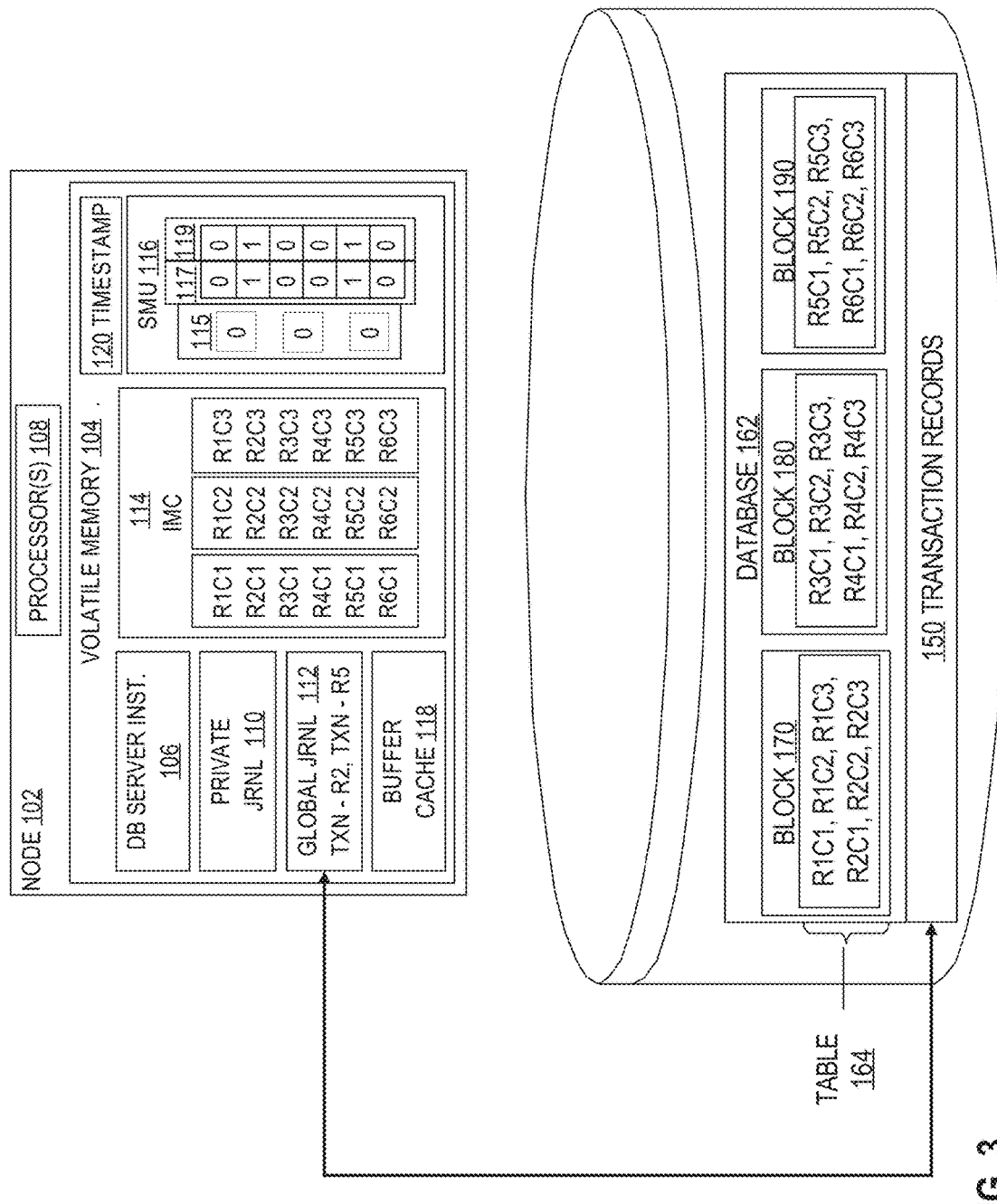
FIG. 3 is a block diagram illustrating a node of a data cluster updating a system change number and a global journal in response to performing a patch-up operation.

When node 102 executes a transaction that reads data items from IMCU 114, the data items that correspond to the marked-invalid blocks need to be obtained from a source other than IMCU 114. Those items may be retrieved, for example, from global journal 112, buffer cache 118, or database 162. FIGS. 2C, 2D and 3 illustrate how the invalidity data in SMU 116 may be converted from block-level invalidity (indicated by block-level invalidity bitmap 115) to row-level invalidity (indicated by row-level invalidity bitmap 117).

As explained above, node 102 may invalidate blocks 170 and 190 in SMU 116 in response to determining that other nodes made changes to the corresponding blocks in database 162. For example, if a different node obtained a write lock on block 170 in order to perform one or more transactions, node 102 may invalidate block 170 in SMU 116. Blocks may be invalidated in SMU 116 regardless of the number of items, within the blocks, that were actually updated. Thus, if changes were only made to row 2, node 102 still updates the bit, within block-level bitmap 115, to indicate block 170 is invalid even though row 1 was not changed.

In response to a patch-up triggering event, node 102 performs a patch-up operation. As part of the patch-up operation, node 102 accesses transaction records 150 to obtain finer-grained update information for the marked-invalid blocks. In the present example, the finer-grained update information is information that indicates which rows within the marked-invalid blocks were actually changed. FIG. 2C is a block diagram illustrating node 102 accessing transaction records 150 to obtain the finer-grained update information for blocks 170 and 190. How the node 102 obtains the finer-grained update information from transaction records 150 shall be described in greater detail hereafter.

FIG. 2D is a block diagram illustrating node 102 updating invalidity data based on accessed transaction records. Specifically, node 102 identifies the rows that were updated in the marked-invalid blocks 170 and 190. In the example depicted in FIG. 2D, only row 2 of block 170 and row 5 of block 190 were actually changed. Consequently, node 102 updates the block-level bitmap 115 to indicate that blocks 170 and 190 are no longer invalid, and updates the row-level bitmap 117 to indicate that rows 2 and 5 are invalid. Thus, in FIG. 2D rows 2 and 5 are marked as invalid in the second column of SMU 116 while the blocks 170 and 190 are no longer marked as invalid in the first column of SMU 116.

Determining Finer-Grained Update Information Based on Undo Records

As mentioned above, during a patch-up operation, a node uses transaction records to obtain finer-grained update information for the marked-invalid blocks. According to one embodiment, a host node does so by taking advantage of the undo records that were generated when changes were made to the marked-invalid blocks. Specifically, according to one embodiment, the host node obtains the current time of the logical clock maintained by the host node. The time thus obtained is then used as the patch-up timestamp. After obtaining the patch-up timestamp, the host node obtains the undo records needed to revert the marked-up blocks from their current state (the state indicated by the patch-up timestamp) to the state indicated by the last-patch timestamp. Initially, when no patch-up operation has yet been performed, the population timestamp of an IMCU is used as the last-patch timestamp.

Analyzing Undo Records to Determine Changed Rows

According to one embodiment, after obtaining the undo records needed to revert the marked-up blocks from their current state to the state indicated by the last-patch timestamp, the host node does not actually need to revert the blocks to that prior state. Rather, the host node analyzes the content of the undo records to determine which specific items within the marked-invalid blocks were actually updated. Based on the information obtained thereby, the host node (a) sets the bits of the row-level invalidity bitmap 117 for the rows that were updated, (b) clears the bits of the block-level bitmap 115 that correspond to the marked-invalid blocks, and (c) updates the last-patch timestamp 120 to the patch-up timestamp.

Comparing Versions of Blocks to Determine Changed Rows

According to an alternative embodiment, the undo records are used to revert the marked-invalid blocks to the state indicated by the last-patch timestamp. The reverted copy of each row in a marked-invalid block is then compared to its corresponding current copy (the copy that reflects the state indicated by the patch-up timestamp). In one embodiment, this may be accomplished by causing the host node to execute a versions query. Based on these comparisons, it may be determined which rows within each block were changed.

Referring again to FIG. 2C, during the patch-up operation, node 102 obtains from transaction records 150 the undo records needed to revert blocks 170 and 190 to the state associated with last-patch timestamp 120 (SCN-A). To determine which items (rows) within the blocks were changed, node 102 may compare a snapshot of the rows within blocks 170 and 190 at last-patch timestamp 120 with the rows within blocks 170 and 190 at the patch-up timestamp. Node 102 may then invalidate the identified items (rows).

In an embodiment in which node 102 compares the two version of each row in the marked-invalid blocks to each other, node 102 compares entries for any given row until a change in the row is identified. For example, if node 102 is identifying invalidations at a row level, node 102 only needs to find one changed entry in a row to determine that the row is invalid. Thus, once a change in a row is identified, node 102 may begin comparing entries in the next row of the block until a changed entry is identified or the entire row has been compared without any changed entries being identified.

Patch-Up Through Redo Records

The transaction records 150 maintained by a database system typically includes redo records as well as undo records. In an embodiment, node 102 uses redo records, rather than undo records, to identify changes in the database between last-patch timestamp 120 and the patch-up timestamp. Redo records identify changes made to the database 12, and are typically generated each time an update operation is performed on database 162. However, redo records are often not organized in such a way as to allow the host node 102 to quickly locate all redo records affecting a particular block. Therefore, identifying which rows, within marked-invalid blocks, that were changed between the last-patch timestamp and the patch-up timestamp using redo records may incur greater overhead than using undo records.

Updating the Global Journal

As explained above, block-to-row patch-up operations involve (a) determining which rows within the marked-invalid blocks were changed, (b) making those changed rows invalid, and (c) marking the mark-invalid blocks to indicate that the blocks are valid again. During the process of determining which rows within the marked-invalid blocks were changed, the host node may obtain information about what the specific changes were, and when those changes were made. Information about those specific changes may not currently be reflected in the global journal, since those changes may have been made by nodes other than the host node.

According to one embodiment, information about what the changes were (including the changed values themselves), and when the changes were made, that is obtained by host node 102 during each patch-up operation is stored in the global journal 112 associated with the IMCU 114. By recording those changes in global journal 112, when a query needs data from a row that is invalid in IMCU 114, the query may obtain the information needed for that row from global journal 112 instead of having to try to find the information in buffer cache 118 or read the data from disk.

FIG. 3 is a block diagram illustrating node 112 updating global journal 112 in response to performing a patch-up operation. Specifically, while performing a patch-up operation, node 102 uses the transaction records 150 (either undo records or redo records) to determine what changes were made to the marked-invalid blocks, and then updates global journal 112 accordingly. The update to global journal 112 may contain the changed values and identify the transactions that updated the rows that are marked invalid in row-level bitmap 117. For example, in an embodiment where node 102 uses undo records to identify transactions that changed rows in particular blocks, node 102 may also store both the changed values and transaction identifiers in global journal 112. For example, in FIG. 3, global journal 112 contains TXN-R2 and TXN-R5 which identify transactions that affected rows 2 and 5 respectively.

In response to updating global journal 112 to identify the changes made to the invalid rows, node 102 may also update journal bitmap 119 to indicate that global journal 112 currently contains transaction data with respect to those invalid rows. For example, rows 2 and 5 are marked in journal bitmap 119 in FIG. 3 in order to indicate that global journal 112 contains transaction data for changes made to rows 2 and 5. Thus, if node 102 receives a query that requires data from either row 2 or row 5, node 102 may determine, based on row-level bitmap 117, that the data is invalid in IMCU 114, and based on journal bitmap 119 that the data is available in global journal 112.

Patch-Up Triggering Events

Patch-up operations are performed in response to a patch-up triggering event. Patch-up triggering events may vary from implementation to implementation. For example, in some cases the mere passage of time may be a patch-up triggering event. Such is the case, for example, if patch-ups are performed daily or at some other interval. On the other hand, patch-up operations may be triggered when a specific event occurs, such as when the host node executes a query that targets data that is mirrored in the IMCU, or when a transaction that updated data items that are mirrored in the IMCU commits.

In an embodiment where executing a query that targets data that is mirrored in the IMCU is a patch-up triggering event, the host node initially determines whether the snapshot time of the query is at or before the last-patch timestamp. If so, then no patch-up needs to be performed to process the query. The query may be processed using only the row-level bitmap as an indication of which data within the IMCU is invalid. On the other hand, if the snapshot time of the query is higher than the last-patch timestamp, then a patch-up operation is performed. As explained above, after performance of the patch-up operation, the last-patch timestamp is updated to the current time, which will match or be greater than the snapshot time of the query.

In an embodiment where patch-up operations are performed when a transaction that updates data items that are mirrored in the IMCU commits, every such commit need not trigger a patch-up operation. For example, according to one embodiment, such commits only trigger patch-up operations when the number of marked-invalid blocks reaches a threshold. For example, patch-up operations may be triggered by commits only when ten or more bits of block-level bitmap 117 are set. As another example, patch-up operations may be triggered by commits only when 10% or more of the bits of block-level bitmap 117 are set.

Patch-up triggering events may also include a release of a lock by another node, updates being written to database 162 on disk, and a determination by node 102 that more than a threshold number of blocks are identified in SMU 116 as invalid.

Patch-Up in Response to Threshold

In an embodiment, node 102 determines whether to perform a patch-up operation in response to determining that the number of blocks identified as invalid in SMU 116 exceeds a particular threshold. For example, node 102 may store data identifying a first threshold number. Node 102 may determine whether the number of invalid blocks in block-level invalidity data in SMU 116 exceeds the first threshold number. If the number of blocks in block-level invalidity data in SMU 116 is less than the first threshold number, node 102 may not perform a patch-up operation. If node 102 determines that the number of invalid blocks in block-level invalidity data in SMU exceeds the first threshold number, node 102 may perform the patch-up operation.

Node 102 may make the determination whether to perform a patch-up operation based on the first threshold number periodically or in response to one or more events. For example, when node 102 invalidates a block in response to a lock on the block being received by another node, node 102 may perform the step of determining whether the number of invalid blocks in SMU 116 exceeds the first threshold number.

Patch-Up in Response to Query and Threshold

As mentioned above, node 102 may perform the patch-up operation in response to receiving a query regardless of the number of invalid blocks in block-level invalidity data in SMU 116. In an alternative embodiment, node 102 makes a determination as to whether to perform a patch-up operation (a) in response to receiving a query, and (b) when a threshold is exceeded. For example, node 102 may be configured to, in response to receiving a query, make a determination as to whether the number of invalid blocks in block-level invalidity data in SMU 116 exceeds the first threshold number. Additionally and/or alternatively, node 102 may make a determination as to whether to perform a patch-up operation in response to receiving a query only if the query targets data in a marked-invalid block.

Foreground Versus Background Patch-Up

In an embodiment, when node 102 performs a patch-up operation in response to a query that targets data that is mirrored in the IMCU, node 102 determines whether to suspend execution of the query until the patch-up operation is completed, or to execute the query without waiting for completion of the patch-up operation. Node 102 may make this decision based on a variety of factors, including but not limited to characteristics of the query (the query's priority, the amount of work involved, etc.) and the predicted duration of the delay that the query will experience if execution of the query is suspended.

According to one embodiment, node 102 may determine to suspend execution of a query because the query targets a marked-invalid block. In such a situation, node 102 updates the invalidity data in SMU 116 before responding to the query. Thus, if block 170 had been marked as invalid but the query only requested information regarding row 1, updating the invalidity data in SMU before responding to the query would allow node 102 to respond to the query with accurate information from IMCU 114.

In an embodiment, node 102 stores a threshold value in order to determine whether to perform the patch-up operation before responding to the query. For example a second threshold value may identify a number of invalid blocks. If the number of blocks in block-level invalidity data in SMU 116 is less than or equal to the second threshold number, node 102 may perform the patch-up operation before responding to the query. If the number of blocks in block-level invalidity data in SMU 116 is greater than the second threshold number, node 102 may perform the patch-up operation after responding to the query.

Embodiments may include any combination of the above-described thresholds. For example, in an embodiment with only the second threshold, a patch-up operation is performed in response to each query with only a determination as to whether to run the patch-up operation in the foreground before responding to the query or in the background after responding to the query.

Patch-Up Determination Example

Figure 5:
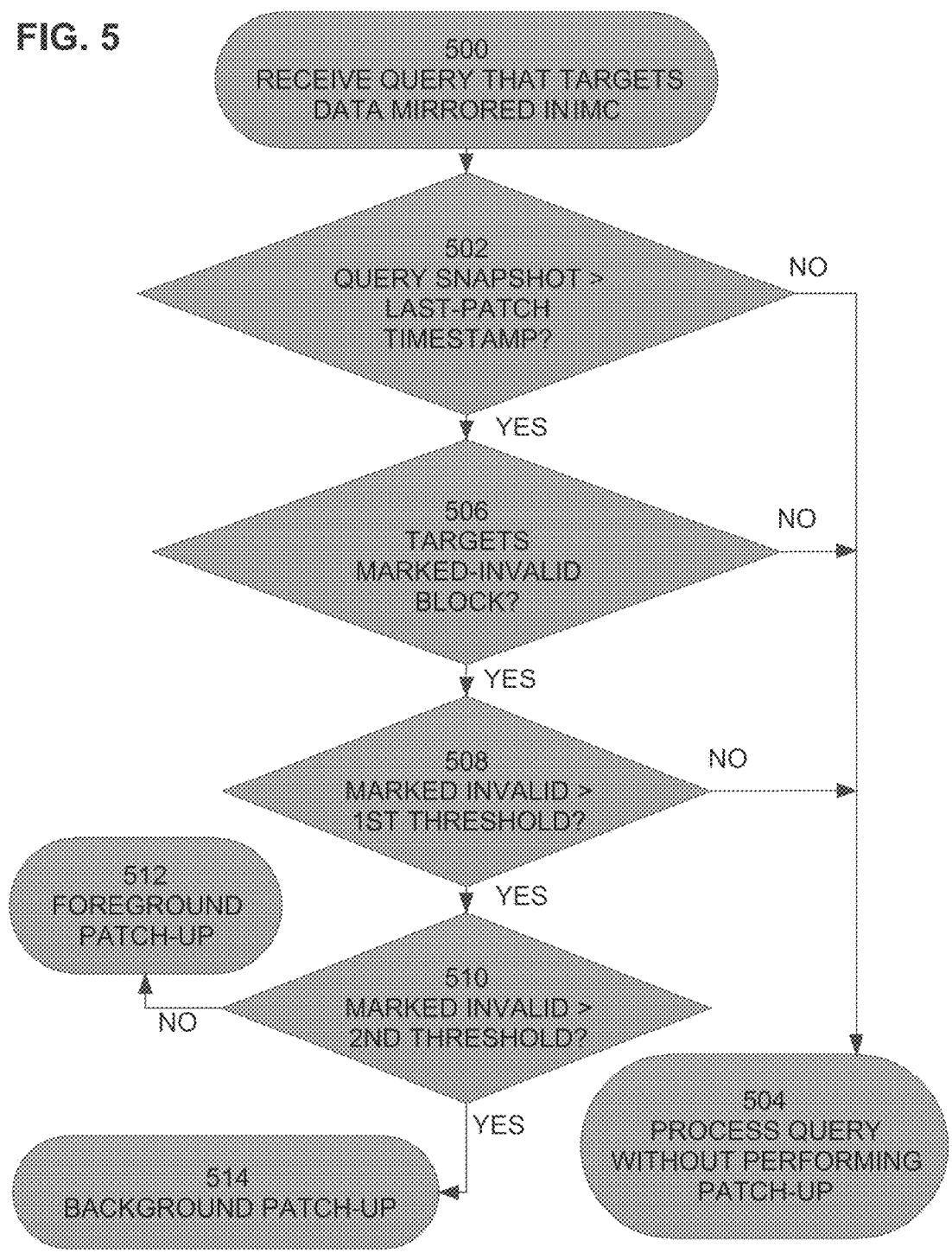
FIG. 5 is a flowchart illustrating a process by which a host node may determine when to perform a patch-up operation, according to an embodiment.

Referring to FIG. 5, it is a flowchart that illustrates a process by which a host node determines whether to perform a patch-up operation, according to one embodiment.

At step 500, a node receives a query that targets data mirrored in an IMCU hosted by the node. In an embodiment, the query has been assigned a query snapshot timestamp which identifies a snapshot time for the query such that the query is able to see changes made by all transactions that have committed as of the time of the query snapshot timestamp, but is not able to see changes made by any transactions that have committed after the query snapshot timestamp.

At step 502, the node determines whether the query snapshot is greater than the last-patch timestamp. For example, if the query is only able to see transactions that have committed before a time T3 and the last-patch timestamp is at a time T4, then the node determines that the query snapshot is not greater than the last-patch timestamp. If the query snapshot is not greater that the last-patch timestamp, then all of the block level invalidity data from before the query snapshot time has been patched due to the patch-up operation that was performed at the last-patch timestamp. Thus, the method may move to step 504 and the node may process the query without performing any patch-up operation. When the node processes the query, the node may ignore any block-level invalidity data, because all block-level invalidity data from before the query snapshot time has been patched and any current block-level invalidity data would have been generated after the query snapshot (i.e. between the last-patch time and a current time).

If the query snapshot timestamp is greater than the last patch timestamp, then the method may move to step 506. At step 506, the node determines whether any targets of the query correspond to a block that is marked invalid. For example, in FIG. 2A, blocks 170 and 190 are marked as invalid. If a query targets information from rows 3 and 4 which are in block 180, node 102 may determine that the targets of the query do not correspond to a block that is marked as invalid. If the node determines that the targets of the query do not correspond to a block that is marked as invalid, then a patch-up operation would not affect the current query. Thus, the method may move to step 506 and the node may process the query without performing the patch-up operation.

If the node determines that one or more targets of the query correspond to a block that is marked invalid, the method may move to step 508. At step 508, the node determines whether the number of blocks that are marked as invalid exceeds a first threshold. For example, a first threshold may be set to ensure that a patch-up operation is not performed at every query, but instead at times when a patch-up operation would be most beneficial. If the number of blocks marked as invalid do not exceed the first threshold, then the method may move to step 506 and the node may process the query without performing the patch-up operation.

If the node determines that the number of blocks that are invalid exceeds the first threshold, the method may move to step 510. At step 510, the node determines whether the number of blocks that are marked as invalid exceeds a second threshold. For example, a second threshold may be set to ensure that large scale patch-up operations do not slow down the processing of the query too severely. If the node determines that the number of blocks that are marked as invalid does not exceed the second threshold, then the method may move to step 512 and the node may perform a foreground patch-up operation before responding to the query. If the node determines that the number of blocks that are marked as invalid exceeds the second threshold, then the method may move to step 514 and the node may respond to the query using the block level invalidity while performing the patch-up operation in the background.

Benefits of Patch-Up Operations

Patch-up operations result in numerous benefits. For example, when a query targets data that is mirrored in an IMCU, the query must obtain data from elsewhere only for those rows that were actually changed, rather than for all rows that belong to blocks that were changed. In addition, when a certain percentage of an IMCU becomes invalid, the IMCU may have to be rebuilt. When block-level invalidity information is converted to row-level invalidity information, the percentage of the IMCU that is invalid decreases. Therefore, patch-up operations may result in IMCU rebuilding operations being performed less frequently. As yet another example, when IMCU rebuilding operations are performed, the old copy of the IMCU may be used to provide some of the data for the new copy of the IMCU. Due to patch-up operations, more data can be used during the rebuilding process can be obtained from the old copy of the IMCU (because more of the old IMCU is valid), than would have been possible without patch-up operations. Consequently, the overhead associated with IMCU rebuild operations is reduced.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
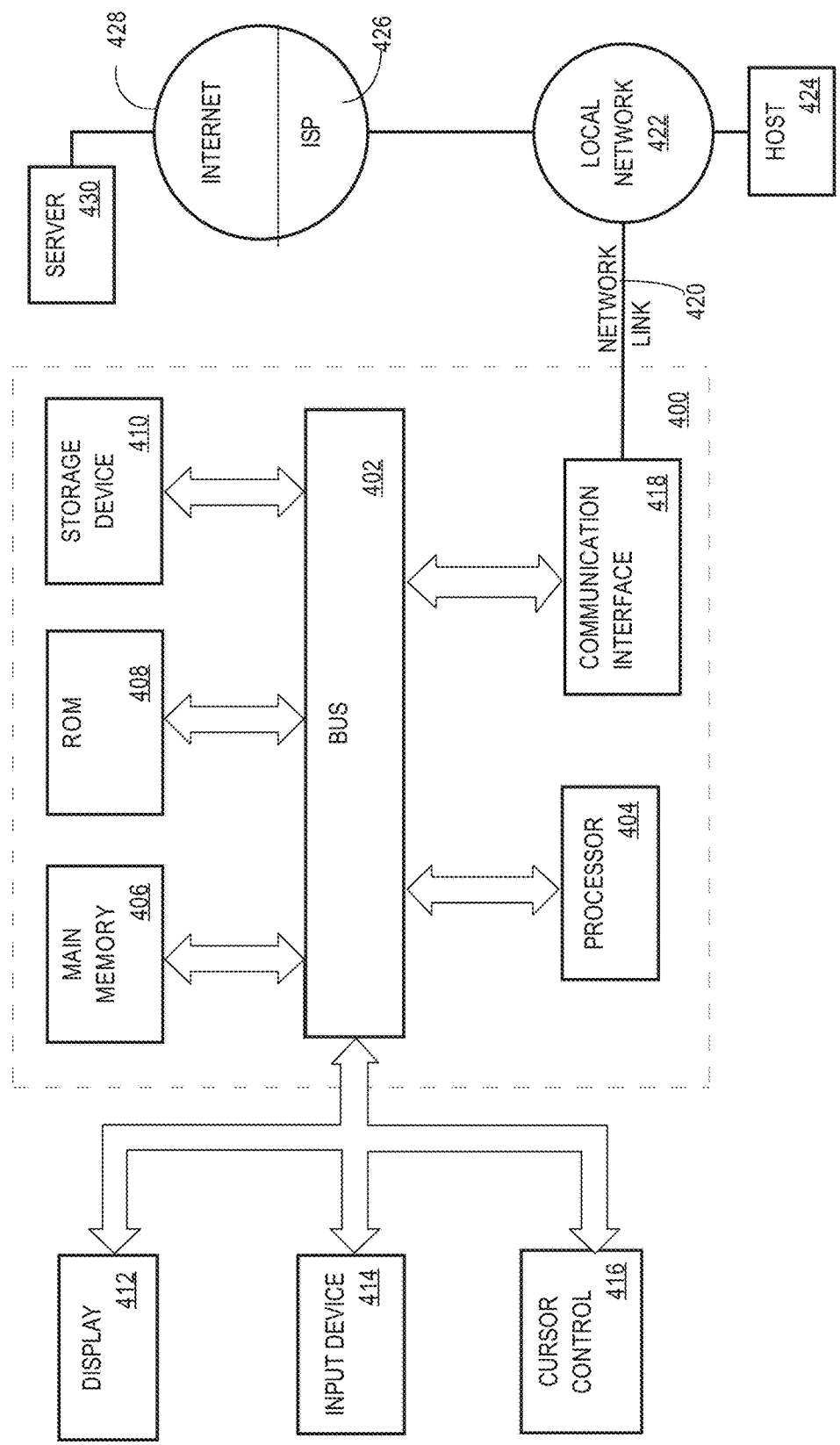
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP)

426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining, on persistent storage, a database that is accessible to a plurality of database server instances;
   wherein each database server instance of the plurality of database server instances is executing on a corresponding node of a plurality of nodes;
   storing a persistent-format copy of a mirrored data set persistently, within the database, on a plurality of coarse-granularity items;
   storing a mirror-format copy of the mirrored data set in an in-memory-unit within volatile memory of a particular node of the plurality of nodes;
   storing, within the particular node, invalidity data that indicates which information, within the mirror-format copy, is invalid;
   wherein the mirror-format copy of the mirrored data is divided into courser-granularity items;
   wherein each courser-granularity item in the mirror-format copy is divided into finer-granularity items;
   wherein the invalidity data includes:
      finer-granularity invalidity data that indicates, on a per-finer-granularity-item basis, invalidity of the information within the mirror-format copy at a first level of granularity; and
      coarser-granularity invalidity data that indicates, on a per-courser-granularity-item basis, invalidity of the information within the mirror-format copy at a second level of granularity that is coarser than the first level of granularity; and
   in response to a patch-up-triggering event, a particular database server instance executing on the particular node performing a patch-up operation on the invalidity data by:
      reading the coarser-granularity invalidity data to determine one or more marked-invalid coarse-granularity items indicated to be invalid by the coarser-granularity invalidity data;
      determining a particular set of fine-granularity items to mark as invalid by determining which fine-granularity items, within each of the one or more marked-invalid coarse-granularity items, are invalid;
      revising the finer-granularity invalidity data to indicate that the particular set of fine-granularity items are invalid; and
      revising the coarser-granularity invalidity data to indicate that the one or more marked-invalid coarse-granularity items are not invalid.

2. The method of claim 1, further comprising:
   identifying one or more undo records associated with each of the one or more marked-invalid coarse-granularity items; and
   determining the particular set of fine-granularity items based, at least in part, on the one or more undo records.

3. The method of claim 2, further comprising:
   identifying a last-patch timestamp associated with the invalidity data; and
   obtaining a patch-up timestamp;
   wherein the step of identifying one or more undo records includes identifying a particular set of undo records that are for changes made, to the one or more marked-invalid coarse-granularity items, between the last-patch timestamp and the patch-up timestamp; and
   wherein the step of determining the particular set of fine-granularity items are determined based, at least in part, on the particular set of undo records.

4. The method of claim 2, further comprising:
   identifying a last-patch timestamp associated with the invalidity data; and
   obtaining a patch-up timestamp;
   wherein the step of identifying one or more undo records includes identifying a particular set of undo records that are for changes made, to the one or more marked-invalid coarse-granularity items, between the last-patch timestamp and the patch-up timestamp;
   using the particular set of undo records to create versions, of the one or more marked-invalid coarse-granularity items, that reflect the last-patch timestamp;
   performing a comparison between the versions that reflect the last-patch timestamp and versions that reflect the patch-up timestamp; and
   wherein the step of determining the particular set of fine-granularity items are determined based, at least in part, on the comparison.

5. The method of claim 1, further comprising:
   identifying a last-patch timestamp associated with the invalidity data;
   obtaining a patch-up timestamp; and
   in response to performing the patch-up operation on the invalidity data, updating the last-patch timestamp to match the patch-up timestamp.

6. The method of claim 1, further comprising:
   receiving, at the particular node from a particular computing device, a particular query;
   identifying a last-patch timestamp associated with the invalidity data;
   determining that a query snapshot time associated with the particular query is greater than the last-patch timestamp;
   performing the patch-up operation in response to determining that the query snapshot time associated with the particular query is greater than the last-patch timestamp.

7. The method of claim 1, further comprising:
storing, within the particular node, a first threshold value;
wherein the patch-up triggering event comprises determining that the coarser-granularity invalidity data indicates invalidity of a number of coarse-granularity items greater than the first threshold value; and
performing the patch-up operation in response to determining that the coarser-granularity invalidity data indicates invalidity of a number of coarse-granularity items greater than the first threshold value.

8. The method of claim 7, further comprising:
wherein the patch-up triggering event comprises receiving, at the particular node from a particular computing device, a particular query; and
performing said determining that the coarser-granularity invalidity data indicates invalidity of a number of coarse-granularity items greater than the first threshold value in response to receiving the particular query.

9. The method of claim 8, further comprising:
storing, within the particular node, a second threshold value;
wherein the patch-up triggering event comprises determining that the coarser-granularity invalidity data indicates invalidity of a number of coarse-granularity items that is less than or equal to the second threshold value and, in response to the determining, performing the patch-up operation before responding to the particular query; and
identifying the specific fine-granularity items as invalid to the particular computing device in response to the particular query.

10. The method of claim 8, further comprising:
storing, within the particular node, a second threshold value;
determining that the coarser-granularity invalidity data indicates invalidity of a number of coarse-granularity items that is greater than the second threshold value and, in response to the determining, responding to the particular query before performing the patch-up operation; and
identifying each coarse-granularity item in the one or more marked-invalid coarse-granularity items as invalid to the particular computing device in response to the particular query.

11. The method of claim 7, further comprising:
receiving, at the particular node, a request to commit one or more transactions that change data in the mirrored data set; and
performing said determining that the coarser-granularity invalidity data indicates invalidity of a number of coarse-granularity items that is greater than the first threshold value in response to receiving the request to commit the one or more transactions to the database.

12. The method of claim 1:
wherein the invalidity data comprises a bitmap which identifies the plurality of coarse-granularity items of the database and one or more contiguous fine-granularity items of the database corresponding to the plurality of coarse-granularity items of the database;
wherein revising the coarser-granularity invalidity data comprises changing one or more bits corresponding to each coarse-granularity item of the one or more marked-invalid coarse-granularity items from one or more bits that indicate invalidity to one or more bits that indicate validity; and
wherein revising the finer-granularity invalidity data comprises changing one or more bits indicating validity and corresponding to fine-granularity items of the plurality of coarse-granularity items that contain data that changed between a snapshot time and a current time from one or more bits that indicate validity to one or more bits that indicate invalidity.

13. The method of claim 1, wherein the snapshot time comprises a time for a query such that the query is able to see changes made by all transactions that have committed as of the snapshot time, but is not able to see changes made by any transactions that have committed after snapshot time.

14. One or more non-transitory computer-readable media storing instructions which, when executed by one or more processors, cause:
maintaining, on persistent storage, a database that is accessible to a plurality of database server instances;
wherein each database server instance of the plurality of database server instances is executing on a corresponding node of a plurality of nodes;
storing a persistent-format copy of a mirrored data set persistently, within the database, on a plurality of coarse-granularity items;
storing a mirror-format copy of the mirrored data set in an in-memory-unit within volatile memory of a particular node of the plurality of nodes;
wherein the mirror-format copy of the mirrored data is divided into courser-granularity items;
wherein each courser-granularity item in the mirror-format copy is divided into finer-granularity items;
storing, within the particular node, invalidity data that indicates which information, within the mirror-format copy, is invalid;
wherein the invalidity data includes:
finer-granularity invalidity data that indicates, on a per-finer-granularity-item basis, invalidity of the information within the mirror-format copy at a first level of granularity; and
coarser-granularity invalidity data that indicates, on a per-coarser-granularity-item basis, invalidity of the information within the mirror-format copy at a second level of granularity that is coarser than the first level of granularity;
receiving, at the particular node from a particular computing device, a particular query; and
in response to receiving the particular query, a particular database server instance executing on the particular node performing a patch-up operation on the invalidity data.

15. The one or more non-transitory computer-readable media of claim 14, wherein performing the patch-up operation on the invalidity data comprises:
reading the coarser-granularity invalidity data to determine one or more marked-invalid coarse-granularity items indicated to be invalid by the coarser-granularity invalidity data;
for each coarse-granularity item in the one or more marked-invalid coarse-granularity items, determining which specific fine-granularity items, within the coarse-granularity item, are invalid;
revising the finer-granularity invalidity data to indicate the specific fine-granularity items, within the one or more marked-invalid coarse-granularity items, that are invalid; and
revising the coarser-granularity invalidity data to indicate that the one or more marked-invalid coarse-granularity items are not invalid.

16. The one or more non-transitory computer-readable media of claim 14, wherein the instructions, when executed by the one or more processors, further cause:
storing, within the particular node, a first threshold value;
identifying a last-patch timestamp associated with the invalidity data;
determining that a query snapshot time associated with the particular query is greater than the last-patch timestamp;
in response to determining that a query snapshot time associated with the particular query is greater than the last-patch timestamp, determining that the coarser-granularity invalidity data indicates invalidity of a number of coarse-granularity items greater than the first threshold value; and
performing the patch-up operation in response to determining that the coarser-granularity invalidity data indicates invalidity of a number of coarse-granularity items greater than the first threshold value.

17. The one or more non-transitory computer-readable media of claim 16, wherein the instructions, when executed by the one or more processors, further cause:
storing, within the particular node, a second threshold value;
determining that the coarser-granularity invalidity data indicates invalidity of a number of coarse-granularity items that is less than the second threshold value and, in response to the determining, performing the patch-up operation before responding to the particular query; and
identifying the specific fine-granularity items as invalid to the particular computing device in response to the particular query.

18. The one or more non-transitory computer-readable media of claim 16, wherein the instructions, when executed by the one or more processors, further cause:
storing, within the particular node, a second threshold value;
determining that the coarser-granularity invalidity data indicates invalidity of a number of coarse-granularity items that is greater than the second threshold value and, in response to the determining, responding to the particular query before performing the patch-up operation; and
identifying each coarse-granularity item in the one or more marked-invalid coarse-granularity items as invalid to the particular computing device in response to the query.

19. A system comprising;
a memory;
one or more processors communicatively coupled to the memory and configured to:
maintain, on persistent storage, a database that is accessible to a plurality of database server instances;
wherein each database server instance of the plurality of database server instances is executing on a corresponding node of a plurality of nodes;
store a persistent-format copy of a mirrored data set persistently, within the database, on a plurality of coarse-granularity items;
store a mirror-format copy of the mirrored data set in an in-memory-unit within volatile memory of a particular node of the plurality of nodes;
wherein the mirror-format copy of the mirrored data is divided into courser-granularity items;
wherein each courser-granularity item in the mirror-format copy is divided into finer-granularity items;
store, within the particular node, invalidity data that indicates which information, within the mirror-format copy, is invalid;
wherein the invalidity data includes:
finer-granularity invalidity data that indicates, on a per-finer-granularity-item basis, invalidity of the information within the mirror-format copy at a first level of granularity; and
coarser-granularity invalidity data that indicates, on a per-coarser-granularity-item basis, invalidity of the information within the mirror-format copy at a second level of granularity that is coarser than the first level of granularity;
receive, at the particular node from a particular computing device, a request to commit one or more transactions to the database; and
in response to receiving the request to commit the one or more transactions to the database, a particular database server instance executing on the particular node performing a patch-up operation on the invalidity data.

20. The system of claim 19, wherein performing the patch-up operation on the invalidity data comprises:
reading the coarser-granularity invalidity data to determine one or more marked-invalid coarse-granularity items indicated to be invalid by the coarser-granularity invalidity data;
for each coarse-granularity item in the one or more marked-invalid coarse-granularity items, determining which specific fine-granularity items, within the coarse-granularity item, are invalid;
revising the finer-granularity invalidity data to indicate the specific fine-granularity items, within the one or more marked-invalid coarse-granularity items, that are invalid; and
revising the coarser-granularity invalidity data to indicate that the one or more marked-invalid coarse-granularity items are not invalid.

* * * * *

UNITED STATES PATENT AND TRADEMARK OFFICE
CERTIFICATE OF CORRECTION

PATENT NO. : 10,372,699 B2  
APPLICATION NO. : 15/264978  
DATED : August 6, 2019  
INVENTOR(S) : He et al.

Page 1 of 1

It is certified that error appears in the above-identified patent and that said Letters Patent is hereby corrected as shown below:

In the Claims

In Column 15, Line 47, in Claim 1, delete "courser-" and insert -- coarser- --, therefor.

In Column 15, Line 48, in Claim 1, delete "courser-" and insert -- coarser- --, therefor.

In Column 15, Line 56, in Claim 1, delete "per-courser" and insert -- per-coarser --, therefor.

In Column 18, Line 27, in Claim 14, delete "courser-" and insert -- coarser- --, therefor.

In Column 18, Line 28, in Claim 14, delete "courser-" and insert -- coarser- --, therefor.

In Column 20, Line 11, in Claim 19, delete "courser-" and insert -- coarser- --, therefor.

In Column 20, Line 12, in Claim 19, delete "courser-" and insert -- coarser- --, therefor.

Signed and Sealed this  
Fourth Day of August, 2020

Andrei Iancu  
*Director of the United States Patent and Trademark Office*